(12) United States Patent
Sala et al.

(10) Patent No.: US 9,334,017 B2
(45) Date of Patent: May 10, 2016

(54) ELECTRONIC REAR DERAILLEUR

(71) Applicant: TIEN HSIN INDUSTRIES CO., LTD., Taichung (TW)

(72) Inventors: Alfredo Sala, Taichung (TW); Douglas Chiang, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 288 days.

(21) Appl. No.: 14/211,421

(22) Filed: Mar. 14, 2014

(65) Prior Publication Data
US 2015/0259031 A1  Sep. 17, 2015

(51) Int. Cl.
*B62M 9/1242* (2010.01)
*B62M 9/122* (2010.01)
*B62M 9/124* (2010.01)

(52) U.S. Cl.
CPC .............. *B62M 9/122* (2013.01); *B62M 9/124* (2013.01)

(58) Field of Classification Search
CPC .... B62M 9/122; B62M 9/124; B62M 9/1242; B62M 25/08
USPC ..................................................... 474/80, 82
See application file for complete search history.

(56) References Cited

U.S. PATENT DOCUMENTS

| 5,514,041 | A | * | 5/1996 | Hsu | B62M 25/08 474/78 |
|---|---|---|---|---|---|
| 5,873,283 | A | * | 2/1999 | Chen | B62M 9/12 192/142 R |
| 5,890,979 | A | * | 4/1999 | Wendler | B62L 3/023 474/110 |
| 6,367,833 | B1 | * | 4/2002 | Horiuchi | B62M 9/122 280/260 |
| 6,993,995 | B2 | * | 2/2006 | Fujii | B62M 25/00 74/489 |
| 2003/0060314 | A1 | * | 3/2003 | Dal Pra | B62M 9/122 474/70 |
| 2013/0110335 | A1 | * | 5/2013 | Durdevic | B62M 6/45 701/22 |
| 2015/0126314 | A1 | * | 5/2015 | Pasqua | B62M 9/122 474/82 |

* cited by examiner

*Primary Examiner* — William E Dondero
*Assistant Examiner* — Robert T Reese
(74) *Attorney, Agent, or Firm* — WPAT, PC; Justin King

(57) ABSTRACT

An electronic rear derailleur comprising a fixing part, a drive element, a transmission assembly, a linkage unit, and a chain adjusting portion. The fixing part has a first joint and a fixing end. The drive element drives a drive wheel. The transmission assembly has a transmission shaft and a transmission element. The linkage unit includes a base, a revolving wheel, and a gear set. The revolving wheel is engaged with the drive portion, and the gear set is disposed in the base. The base has a first and a second end, and the chain adjusting portion has a second joint pivotally connected to the second end, so that the chain adjusting portion rotates relative to the base. The gear set is connected with the first and the second joint so as to make the first and the second joint synchronizely rotate, so that the adjusting portion shifts the chain.

10 Claims, 8 Drawing Sheets

ELECTRONIC REAR DERAILLEUR

BACKGROUND OF THE INVENTION

1. Field of Invention

The present invention relates to a derailleur of bicycles, and more particularly, to an electronic rear derailleur of bicycles, which can prevent from a jam or an unstable drive problem.

2. Related Art

Currently, most of modern bicycles have a variable-speed function through a rear derailleur installed on bicycles. Through the rear derailleur, the bicycle chain can be shifted from a present sprocket to a target sprocket of the rear sprockets, so as to achieve the variable-speed function. In addition, due to the advancement of bicycle industry, the rear derailleur has been developed to an electronic derailleur driven by an electric motor. In this configuration, a bicycle shifter installed on the handlebar of the bicycle is used to control the activation of the electric motor. When receiving a signal to activate, the electric motor will drive gear sets to drive the derailleur, so that the chain of the bicycle can be shifted to a predetermined sprocket to achieve the variable-speed function.

However, the bicycle may be vibrated when driving in road, so that the components of the derailleur may be also vibrated, which may lead to misalignment or jam between the gear sets. Especially, when the derailleur is suffered an impact, the impact may not only cause the misalignment or jam of the gear sets, but damage the electric motor, which leads to the problem of inaccurate speed change or even need to replace a new electric motor.

SUMMARY OF THE INVENTION

Accordingly, the objective of the present invention is to solve the problem of gear jam and electric motor breakdown when the conventional electronic derailleur suffers an impact.

To achieve the above objective, the present invention provides an electronic rear derailleur installed on a bicycle, and the electronic rear derailleur comprises a fixing part, a drive element, a transmission assembly, a linkage unit, and a chain adjusting portion. The fixing part has a first joint and a fixing end. The drive element drives a drive wheel to rotate. The transmission assembly includes a transmission shaft and a transmission element, the transmission shaft is disposed with a driven wheel and a threaded section, and the driven wheel is engaged with the drive wheel and rotated by the drive wheel. In addition, the transmission element has a threaded hole and a drive portion, and the transmission element is threaded with the threaded section through the threaded hole and can move back and forth relative to the transmission shaft. Furthermore, the linkage unit includes a base, a revolving wheel and a gear set, and the base has a first end and a second end. The first end is pivotally connected with the first joint and rotated about the first joint as an axle, and the revolving wheel is engaged with the drive portion. In addition, the gear set is disposed in the base and engaged with the revolving wheel and rotated by the revolving wheel. The chain adjusting portion has a second joint and pivotally connected to the second end, so that the chain adjusting portion can be rotated relative to the base. Besides, the gear set is connected with the first joint and the second joint, so as to make the first joint and the second joint synchronizely rotate and then drive the base to rotate, so that the chain adjusting portion drives the bicycle chain to shift; therefore, the chain adjusting portion can shift the bicycle chain to a sprocket to achieve a variable-speed function.

When the bicycle equipped with an electronic rear derailleur of the present invention is vibrated due to road conditions or impacted with foreign objects during driving, the chain adjusting portion may be vibrated or impacted. When the impact force is transmitted from the chain adjusting portion to the revolving wheel, the rotation force of the revolving wheel will transmit to the drive portion, so that the transmission element generates a push force parallel to the tangential direction of the engaged portion between the revolving wheel and the drive portion. However, because the transmission element is screwed in the transmission shaft, the push force will be absorbed by the threaded section of the transmission shaft and the threaded hole of the transmission element and the push force will not transmit toward the drive element. Thereby, it can prevent the drive components from being jammed or breakdown under an intense impact force, so as to prevent a jam or an unstable drive problem for conventional electronic rear derailleur.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Hereinafter, embodiments will be described in detail with reference to accompanying drawings so that those skilled in the art can easily work with the embodiments. However, the embodiments may not be limited thereto.

Figure 1:
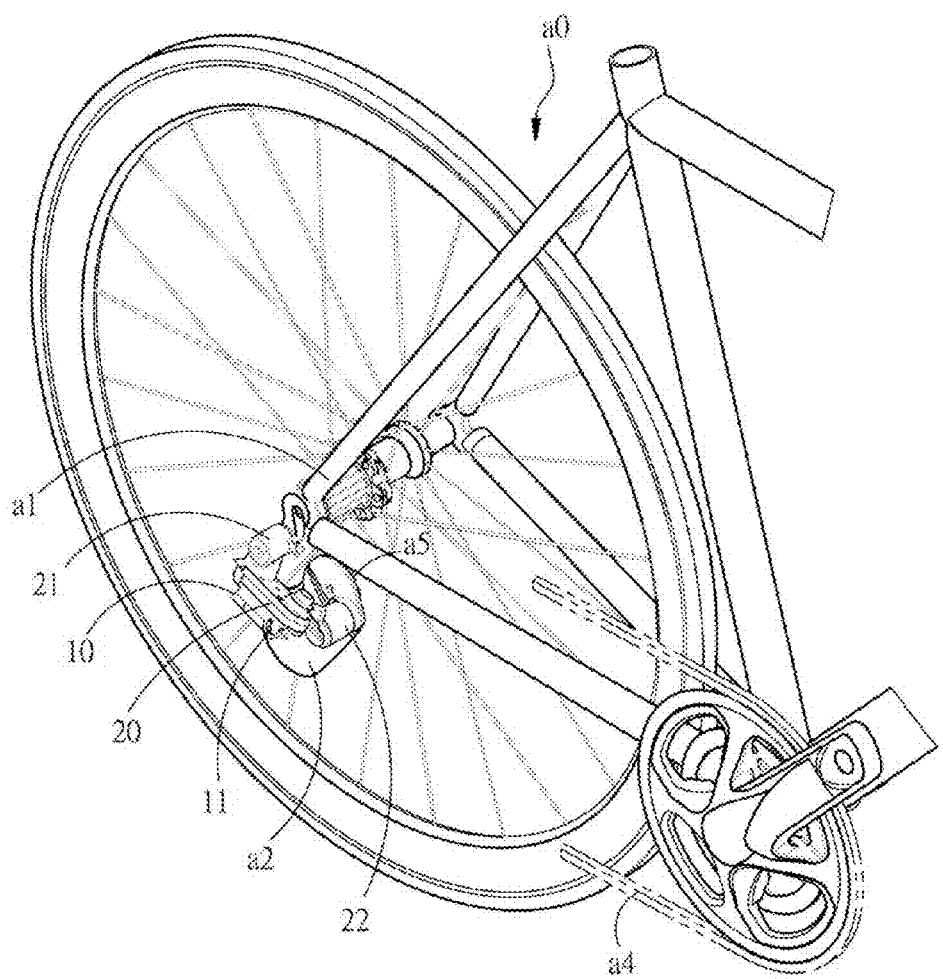
FIG. 1 is a perspective view of an electronic rear derailleur installed on a bicycle according to one embodiment of the present invention.
Figure 2:
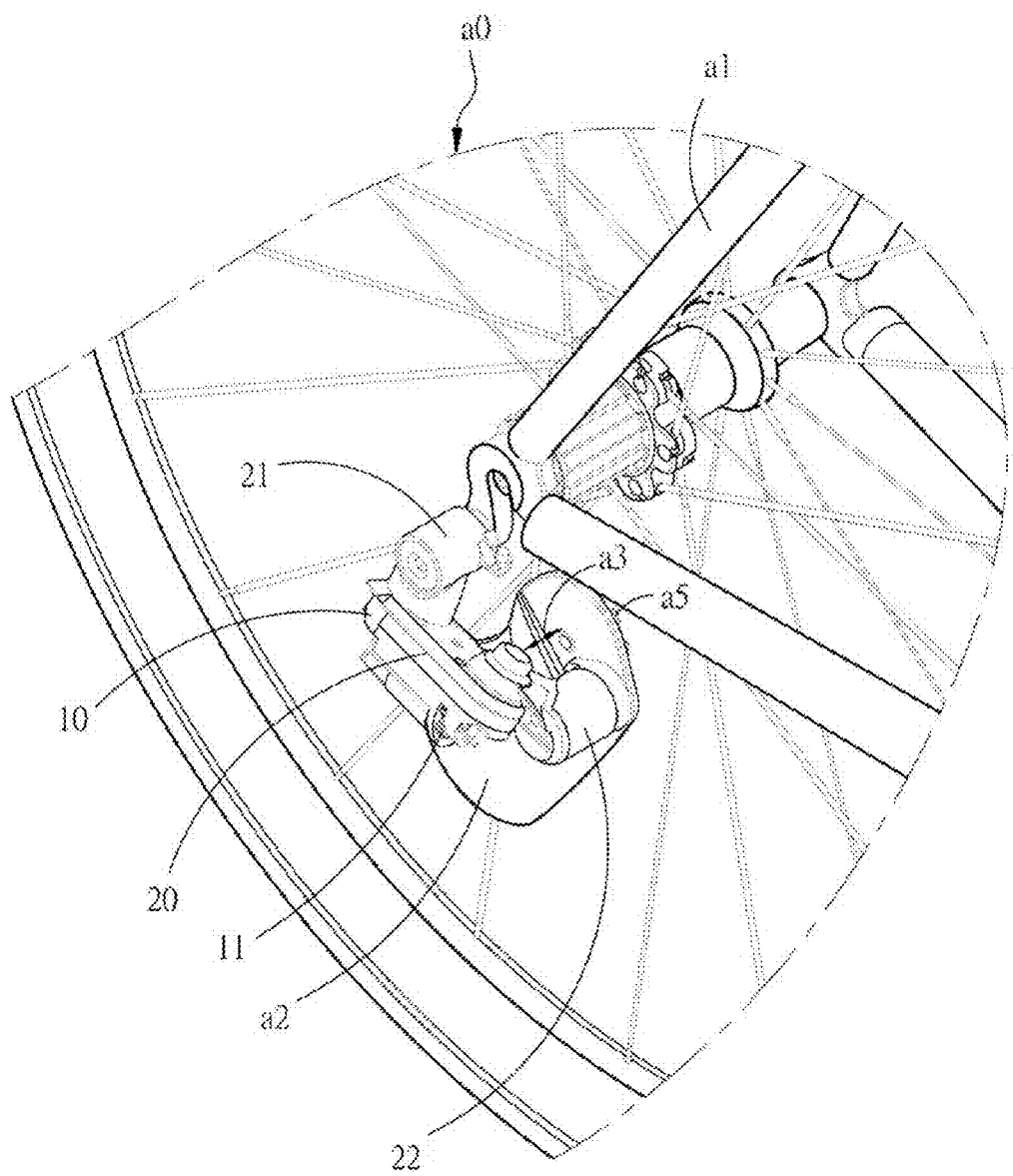
FIG. 2 is an enlarged view of the electronic rear derailleur installed on a bicycle according to one embodiment of the present invention.
Figure 3:
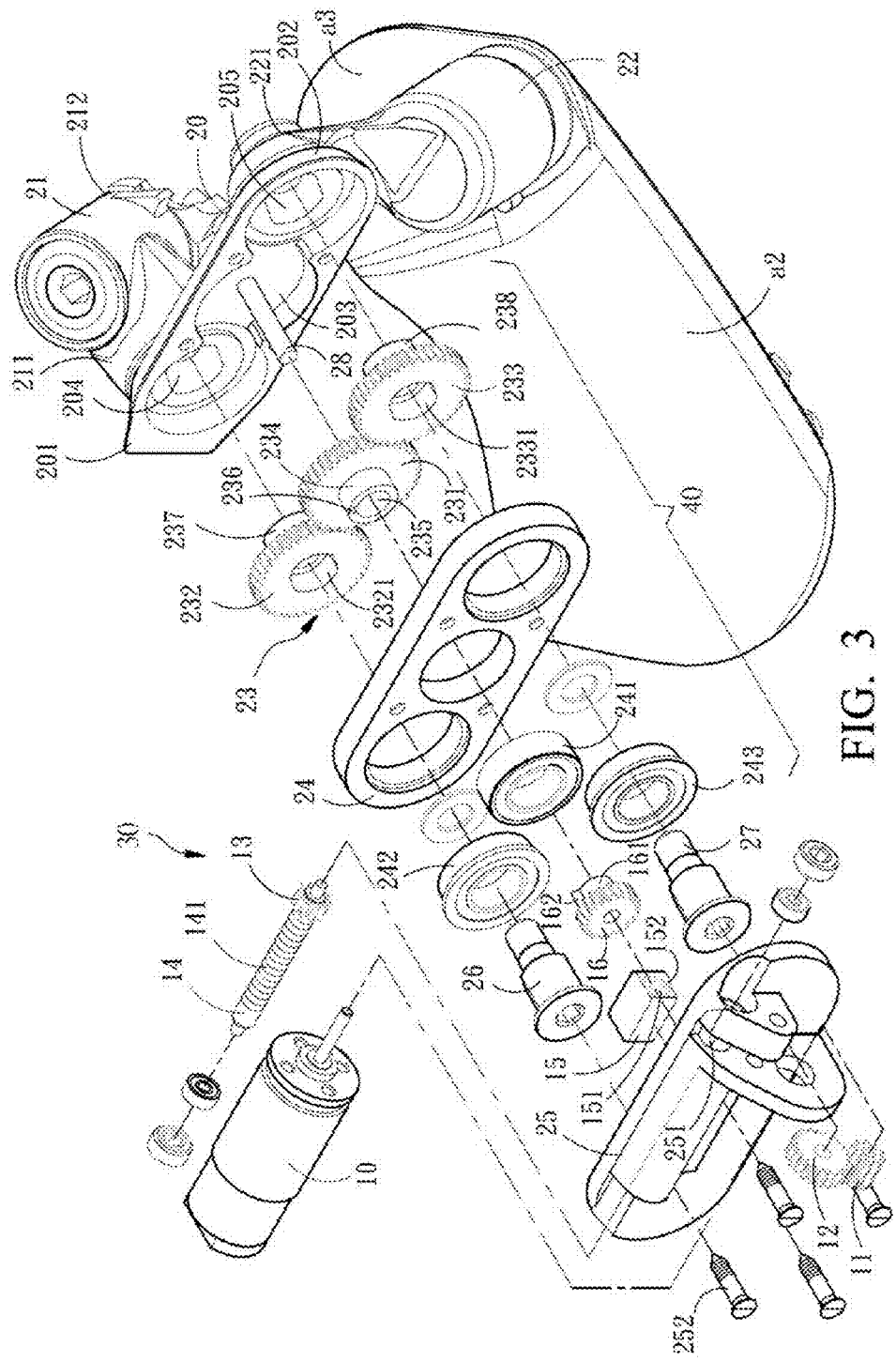
FIG. 3 is an exploded view of an electronic rear derailleur according to one embodiment of the present invention.
Figure 4:
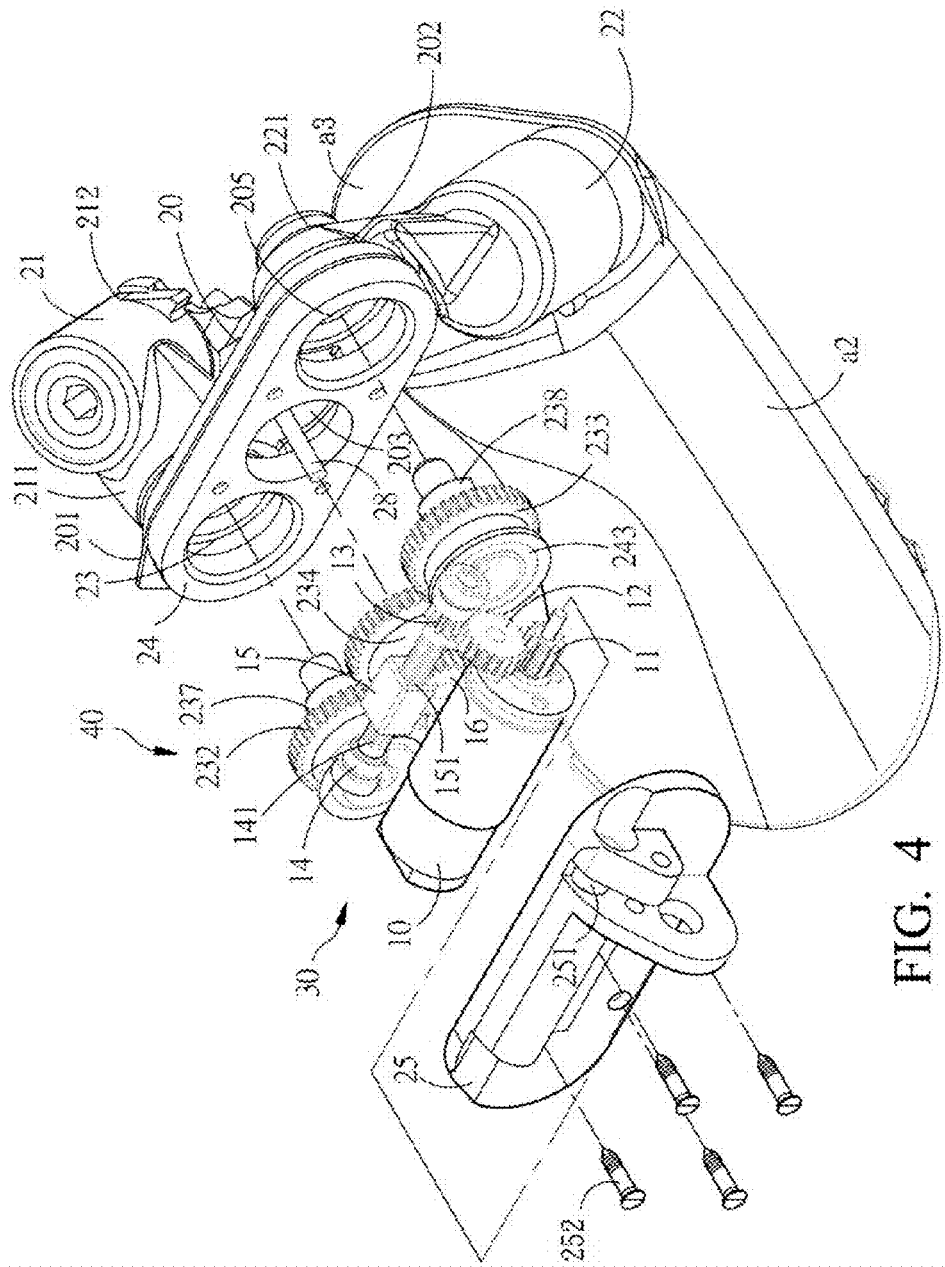
FIG. 4 is a partial assembled structure according to one embodiment of the present invention.

Please refer to FIGS. 1 to 5, firstly, refer to FIGS. 1-3, they are a perspective view, an enlarged view, and an exploded view of an electronic rear derailleur installed on a bicycle according to an embodiment of the present invention. The electronic rear derailleur of the present invention is installed on a seat stay a1 of a bicycle a0 to make a bicycle chain 4 to have a shifting movement, and the electronic rear derailleur includes a fixing part 21, a drive element 10, a transmission assembly 30, a linkage unit 40, and a chain adjusting portion 22.

The fixing part 21 includes a first joint 211 and a fixing end 212. The fixing end 212 is used to connect with the seat stay a1, and the first joint 211 is used to connect with the linkage unit 40. In addition, a portion of the first joint 211 where is connected with the linkage unit 40 is formed with a first concave 204.

The drive element 10 is used to drive a drive wheel 11 to rotate, and in the embodiment of the present invention, the drive element 10 is an electric motor.

The transmission assembly 30 includes a transmission shaft 14 and a transmission element 15, and the transmission shaft 14 is disposed with a driven wheel 13 and a threaded section 141. The drive wheel 11 is engaged with an idle wheel 12, and the idle wheel 12 is engaged with the driven wheel 13. Thereby, the drive wheel 11 drives the driven wheel 13 to rotate. The transmission element 15 has a threaded hole 151 and a drive portion 152 having a plurality of engaging teeth. The threaded hole 151 of the transmission element 15 is screwed by the threaded section 141 of the transmission shaft 14, so that the transmission element 15 can move back and forth relative to the transmission shaft 14.

The linkage unit 40 includes a base 20, a revolving wheel 16, and a gear set 23. The base 20 has a first end 201, a second end 202, a spindle 28, a receiving space 203, and a cover plate 25. The first end 201 is pivotally connected with the first joint 211 to pivotally rotate by using the first joint 211 as an axle, and the gear set 23 is disposed in the base 20. In addition, the revolving wheel 16 is engaged with the drive portion 152, and the revolving wheel 16 is inserted in and coupled with the spindle 28. One side of the revolving wheel 16 is disposed with a collar 161, and the outer periphery of the collar 161 has a protrusion 162. In the present embodiment, the drive wheel 11, the idle wheel 12, and the driven wheel 13 are engaged with each other by saw teeth on their peripheries.

Figure 6:
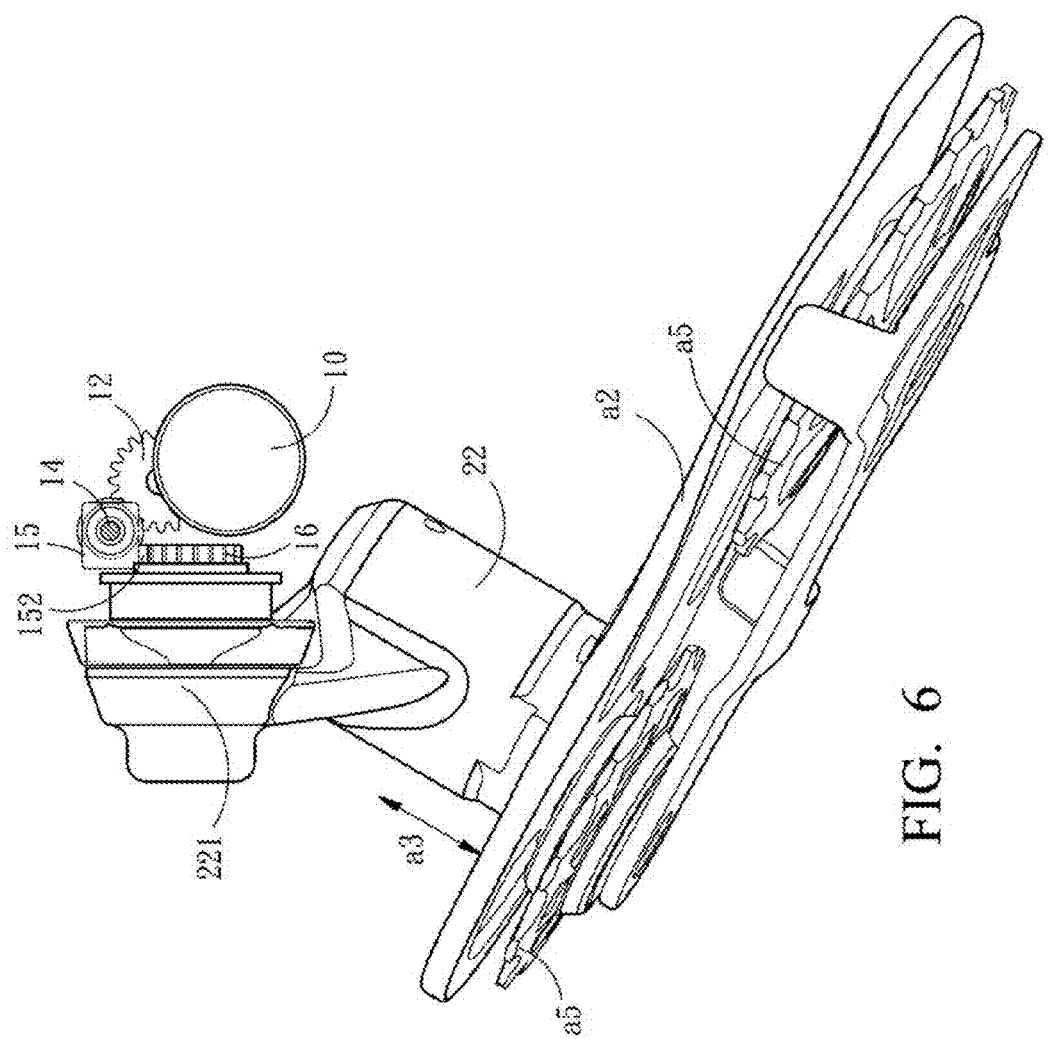
FIG. 6 is a partial plan view according to one embodiment of the present invention.
Figure 7A:
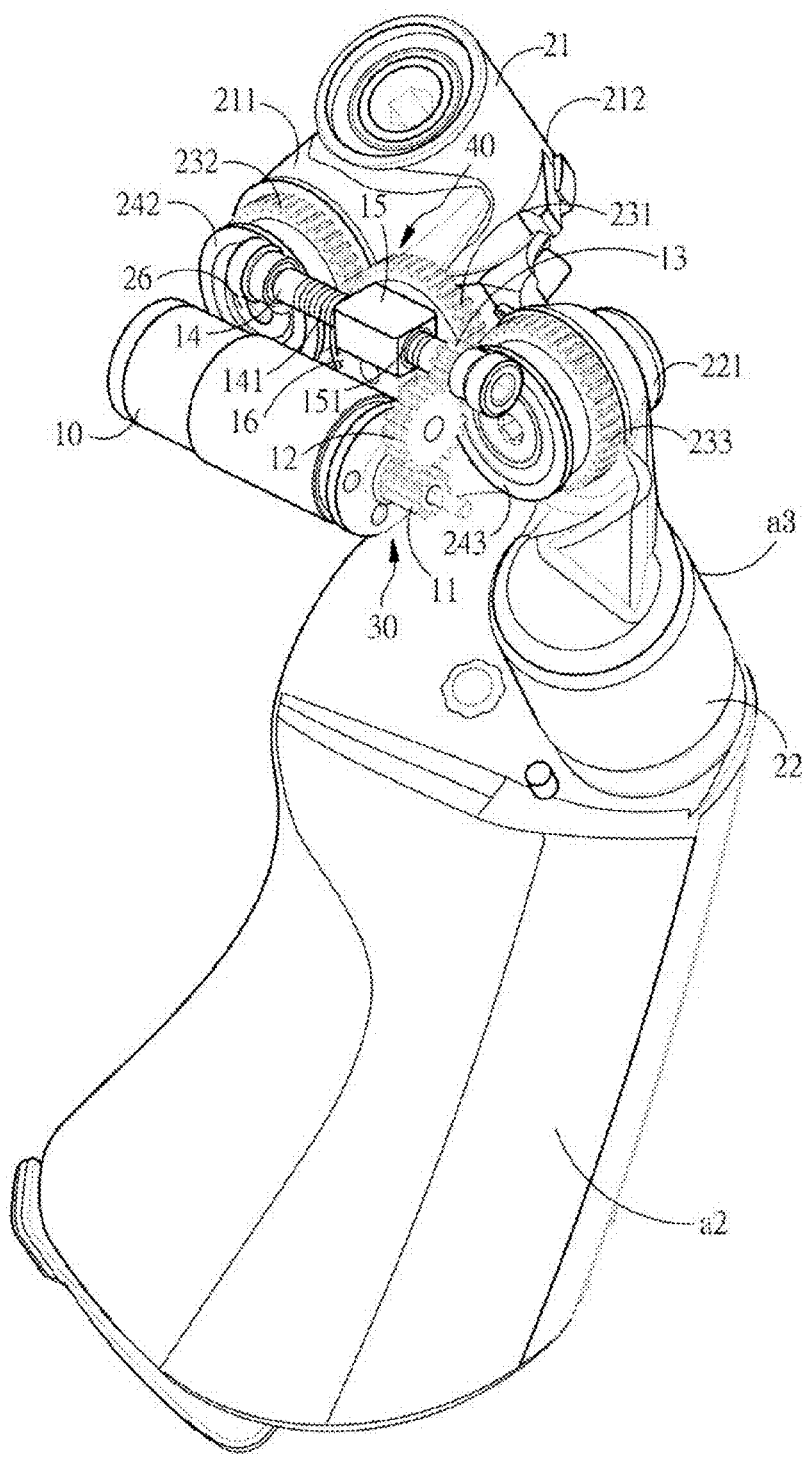
FIGS. 7A and 7B are views of an electronic rear derailleur in operations according to one embodiment of the present invention.
Figure 7B:
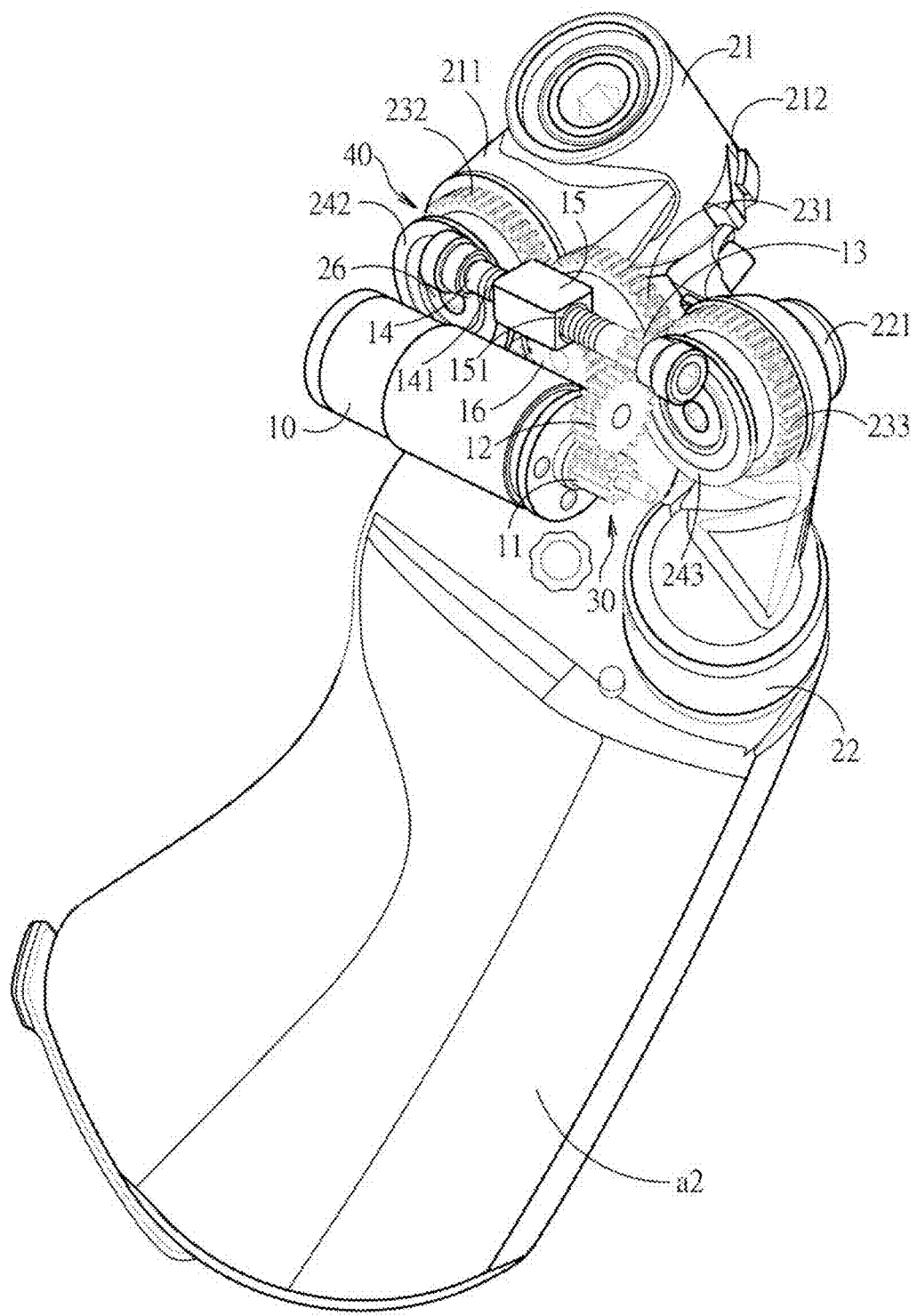

The chain adjusting portion 22 has a second joint 221 pivotally connected with the second end 202, so that the chain adjusting portion 22 can rotate relative to the base 20. In addition, a portion of the second joint 221 where is connected with the second end 202 has a second concave 205. The chain adjusting portion 12 is connected to a pulley holder a2. Please see FIG. 6, the pulley holder a2 has disposed with at least one pulley a5 for meshing with the bicycle chain a4. The base 20 and the pulley holder a2 are formed with a gap a3 to prevent the pulley holder a2 from being interfered by the base 20.

Figure 5:
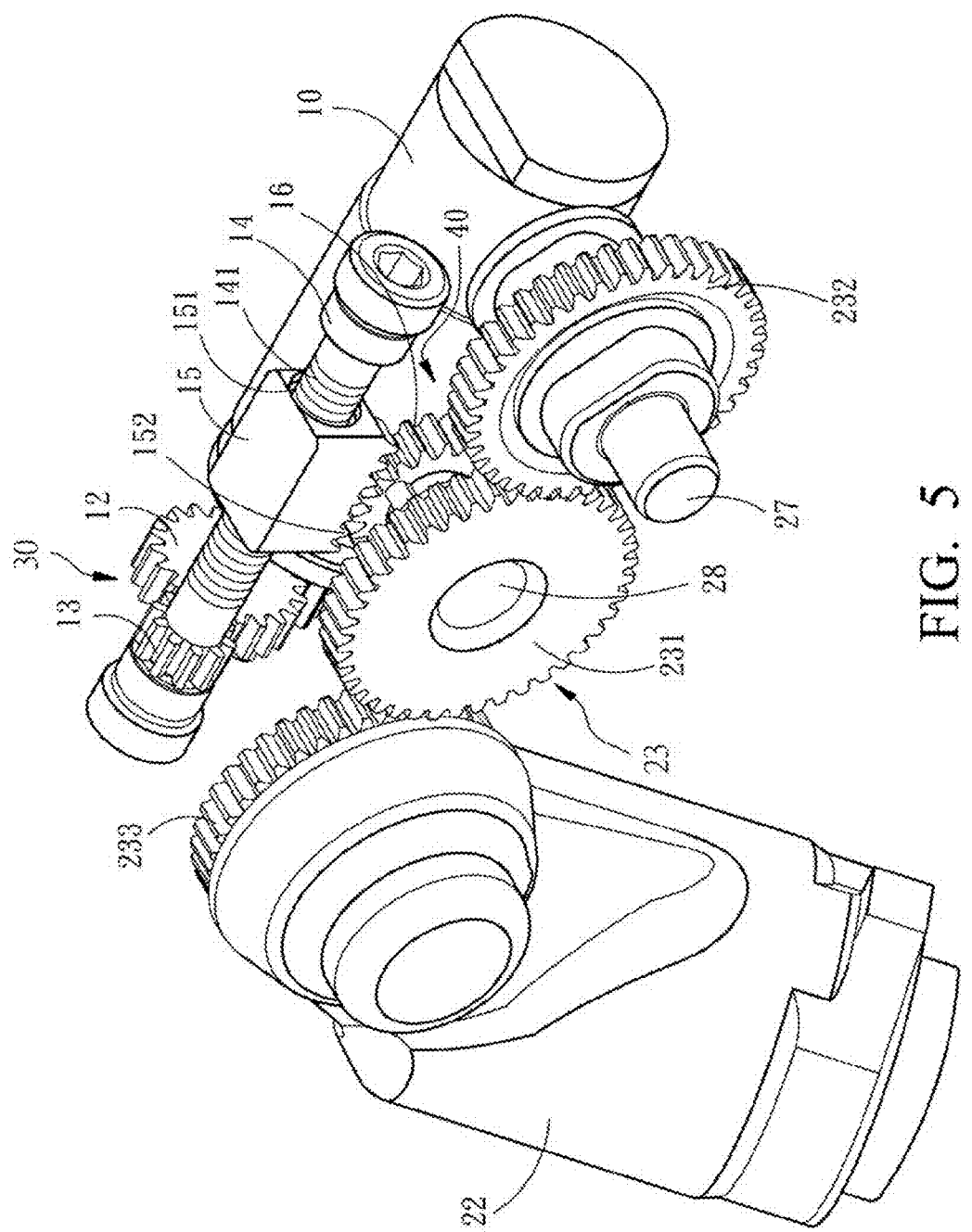
FIG. 5 is another partial assembled structure according to one embodiment of the present invention.

Please refer to FIG. 5, a gear set 23 is driven by the revolving wheel 16 to rotate. The gear set 23 includes a main drive gear 231, a first gear 232, a second gear 233 installed in the receiving space 203. The main drive gear 231 is located between the first and the second gear 232, 233, and engaged with them. Thereby, the main drive gear 231 can simultaneously drive the first and the second gear 232, 233. One side of the main drive gear 231 facing the cover plate 25 is disposed with a main flange 234, and the main flange 234 is disposed in the center of a main drive bearing 241. In addition, the main drive gear 231 is disposed with a center hole 235 therein and the main flange 234 has a notch 236, and the protrusion 162 of the revolving wheel 16 is engaged with the notch 236.

Please refer to FIG. 3 again, the detailed configuration of the gear set 23 will be described. The center of the first gear 232 is formed with a non-circular shaped first shaft hole 2321 for pivotally receiving a first shaft 26. The shape of one end of the first shaft 26 is corresponding to that of the first shaft hole 2321, and the end of the first shaft 26 is fixedly mounted in the first shaft hole 2321. Thereby, the first gear 232 can drive the first shaft 26 to rotate. In addition, a first bearing 242 is disposed between the shaft seat 24 and the first shaft 26, and is used to reduce friction between the first shaft 26 and the shaft seat 24. The center of the second gear 233 is also formed with a second shaft hole 2331 for pivotally receiving a second shaft 27. The shape of one end of the second shaft 27 is corresponding to that of the second shaft hole 2331, and the end of the second shaft 27 is fixedly mounted in the first shaft hole 2331. In addition, the second shaft 27 is pivotally coupled to a second bearing 243 disposed between the second shaft 27 and the shaft seat 24. The second shaft 27 is inserted and disposed in the second gear 233, such that the second gear 233 can drive the second shaft 27 to rotate.

The cover plate 25 is used to cover the transmission element 15 and is disposed with a through hole 251 for mounting a transmission shaft 14. The cover plate 25 is fixed to the base 20 by a plurality of connection elements 252 (for example, a screw) into the shaft seat 24, such that the cover plate 25, the shaft seat 24 and the base 20 are combined together.

The drive element 10 and the drive wheel 11 are disposed in the cover plate 25, and the drive wheel 11, the idle wheel 12 and the driven wheel 13 are exposed to the outer side of the cover plate 25. Please refer to FIG. 3, FIG. 6 and FIGS. 7A and 7B, the drive element 10 drives the drive wheel 11 to rotate after being activated. The drive wheel 11 drives the driven wheel 13 to rotate by the idle wheel 12, then the driven wheel 13 drives the transmission shaft 14 to rotate; in addition, through a threaded connection of the threaded section 141 of the transmission shaft 14 with the threaded hole 151 of the transmission element 15, the transmission element 15 can move along the transmission shaft 14. Then, through an engagement of the drive portion 152 of the transmission element 15 with the teeth of revolving wheel 16, the revolving wheel 16 is driven to rotate by using the spindle 28 as an axle, and the revolving wheel 16 further drives the main drive gear 231 to rotate. The main drive gear 231 is engaged with the first gear 232 and the second gear 233, the first flange 237 of the first gear 232 is engaged with the first concave 204 of the base 20, and the second flange 238 of the second gear 233 is engaged with the second concave 205, such that the main drive gear 231 can drive the first gear 232 and the second gear 233 simultaneously, and the first gear 232 and the second gear 233 can together drive the base 20 to rotate by using the fixing part 21 as an axle; therefore, the chain adjusting portion 22 moves the pulley holder a2, and the movement of the pulley holder a2 leads the pulley a5 to move as well. The bicycle chain a4 is meshed with the pulley a5 and the bicycle chain a4 is shifted with the pulley a5. So that the bicycle chain a4 can be shifted to from a presented sprocket to a target sprocket of the bicycle a0 (not shown) to achieve a variable speed operation.

Bicycles may be vibrated or impacted during driving. When the base 20 or the pulley holder a2 is vibrated or impacted, the force transmitting path in sequence is from the second gear 233, the main drive gear 231, the revolving wheel 16, the transmission element 15, the transmission shaft 14, the driven wheel 13, the idle wheel 12, the drive wheel 11, and finally to the drive element 10. When the impact force transmits to the revolving wheel 16, the revolving wheel 16 rotate to transmit the force to the transmission element 15, which causes the transmission element 15 to generate a push force parallel to the tangential direction of the engaged portion between the revolving wheel 16 and the drive portion 152. However, the transmission element 15 is threaded to the transmission shaft 14, the push force is absorbed by the threaded section 141 of the transmission shaft 14 and the threaded hole 151 of the transmission element 15, so that the impact force will not impact the idle wheel 12 and the teeth of the drive wheel 11 directly. Thereby, the jam or shifting problem of engaging teeth of the driven wheel 13 and the idle wheel 12 due to an impact, or the push force impacts the drive element 10 which results in the breakdown of the drive components can be solved according to the present invention.

It will be apparent to those skilled in the art that various modifications and variations can be made according to the structure of the present invention without departing from the scope or spirit of the present invention. In view of the foregoing, it is intended that the present invention cover modifications and variations of this invention provided they fall within the scope of the following claims and their equivalents.

What is claimed is:

1. An electronic rear derailleur, installed on a bicycle for guiding a bicycle chain, comprising:
    a fixing part, having a first joint and a fixing end connected with the bicycle;
    a drive element, driving a drive wheel to rotate;
    a transmission assembly, having a transmission shaft and a transmission element, the transmission shaft being disposed with a driven wheel and a threaded section, the driven wheel being rotated by the drive wheel, the transmission element having a threaded hole and a drive portion, and the transmission element being threaded with the threaded section through the threaded hole so as to be moved back and forth corresponding to the transmission shaft;
    a linkage unit, including a base, a revolving wheel, and a gear set, the base having a first end and a second end, the first end being pivotally connected with the first joint and rotated about the first joint as an axle, the revolving wheel being engaged with the drive portion, the gear set being disposed in the base, and the gear set being engaged with the revolving wheel and rotated by the revolving wheel; and
    a chain adjusting portion, having a second joint and pivotally connected to the second end, so that the chain adjusting portion rotates relative to the base;
    wherein the gear set is respectively connected with the first joint and the second joint so as to make the first joint and the second joint synchronizely rotate and then drive the base to rotate, so that the chain adjusting portion shift the bicycle chain.

2. The electronic rear derailleur as claimed in claim 1, wherein the base further comprises a cover plate and a shaft seat, the shaft seat is disposed between the base and the cover plate, the cover plate, the shaft seat and the base are combined by using a connection element, the base has a receiving space and the gear set is installed therein, the gear set has a main drive gear, a first gear and a second gear, wherein the main drive gear is located between the first gear and the second gear, and is respectively engaged with the first gear and the second gear, and the main drive gear is rotated by the transmission element.

3. The electronic rear derailleur as claimed in claim 2, wherein a first shaft hole is formed in the center of the first gear for pivotally receiving a first shaft, and a second shaft hole is formed in the center of the second gear for pivotally receiving a second shaft.

4. The electronic rear derailleur as claimed in claim 3, wherein the first shaft is inserted into a first bearing, the first bearing is disposed between the shaft seat and the first shaft, and the first shaft are engaged with the first shaft hole so as to drive the first shaft to rotate; the second shaft is pivotally coupled to a second bearing, the second bearing is disposed between the second shaft and the shaft seat, the second shaft are engaged with the second shaft hole so as to drive the second shaft to rotate.

5. The electronic rear derailleur as claimed in claim 4, wherein the first joint has a first concave communicated with the receiving space, the first gear is disposed with a first flange engaged with the first concave, and the second joint has a second concave communicated with the receiving space, the second gear is disposed with a second flange engaged with the second concave.

6. The electronic rear derailleur as claimed in claim 2, wherein the revolving wheel has a collar protruded from one side thereof, and periphery of the collar is formed with a protrusion, the main drive gear is formed with a center hole therein, and the main drive gear has a notch, and the protrusion is engaged with the notch.

7. The electronic rear derailleur as claimed in claim 6, wherein one side of the main drive gear is formed with a main flange, and the main flange is disposed in a center of a main drive bearing.

8. The electronic rear derailleur as claimed in claim 1, wherein the chain adjusting portion is disposed with a pulley holder, the pulley holder comprises at least one pulley for meshing with the bicycle chain.

9. The electronic rear derailleur as claimed in claim 1, wherein the drive element further comprises an idle wheel, and the idle wheel is engaged with the drive wheel and the driven wheel respectively.

10. The electronic rear derailleur as claimed in claim 1, wherein the drive element is an electric motor.

* * * * *